Dec. 9, 1969 — D. M. CUNNINGHAM — 3,483,357
HEATING APPARATUS
Filed Sept. 16, 1966 — 4 Sheets-Sheet 1
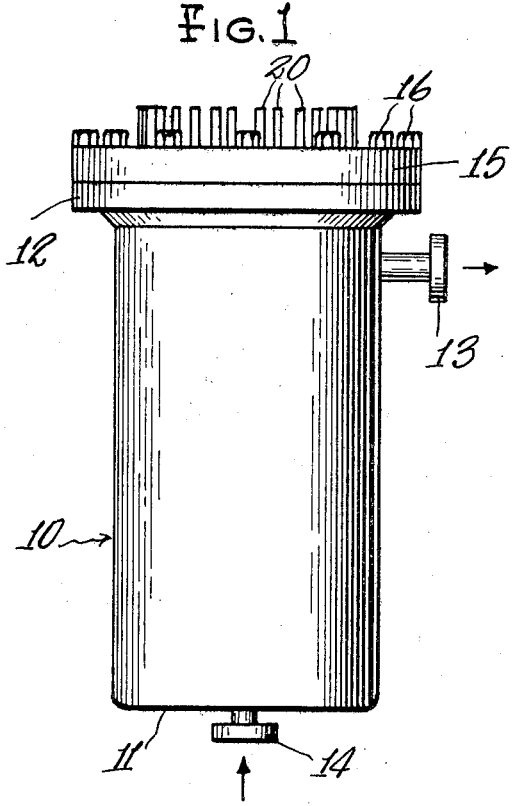
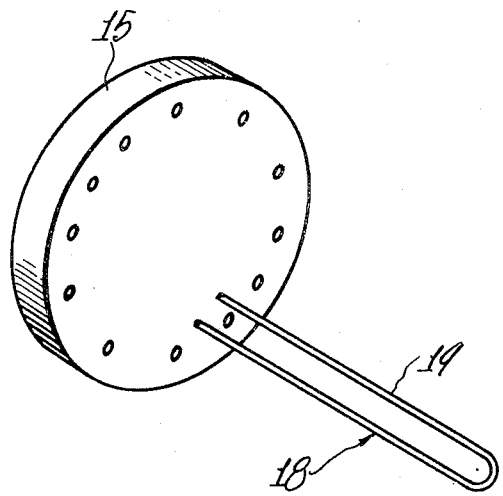
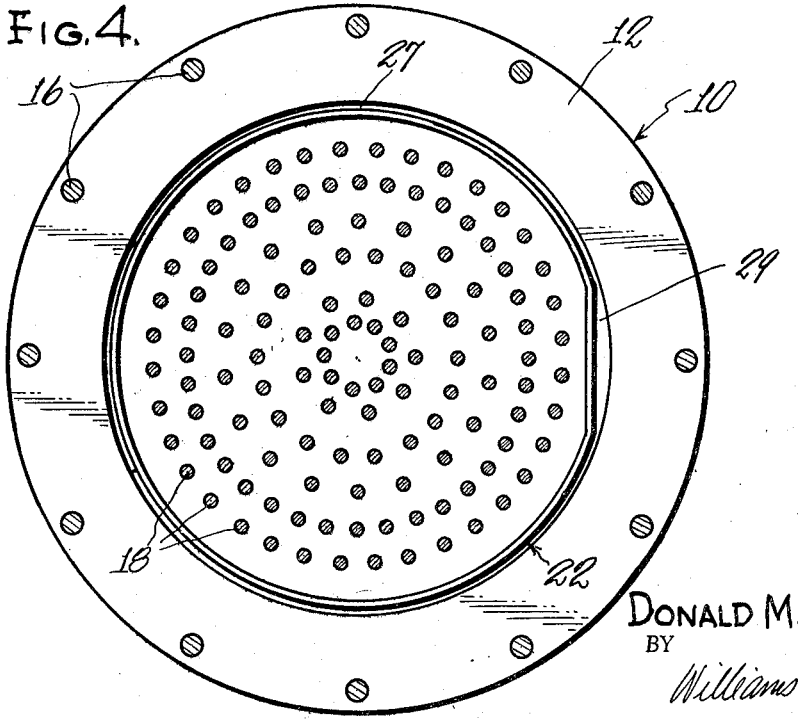
INVENTOR.
DONALD M. CUNNINGHAM
BY
Williams and Kreske
ATTORNEYS

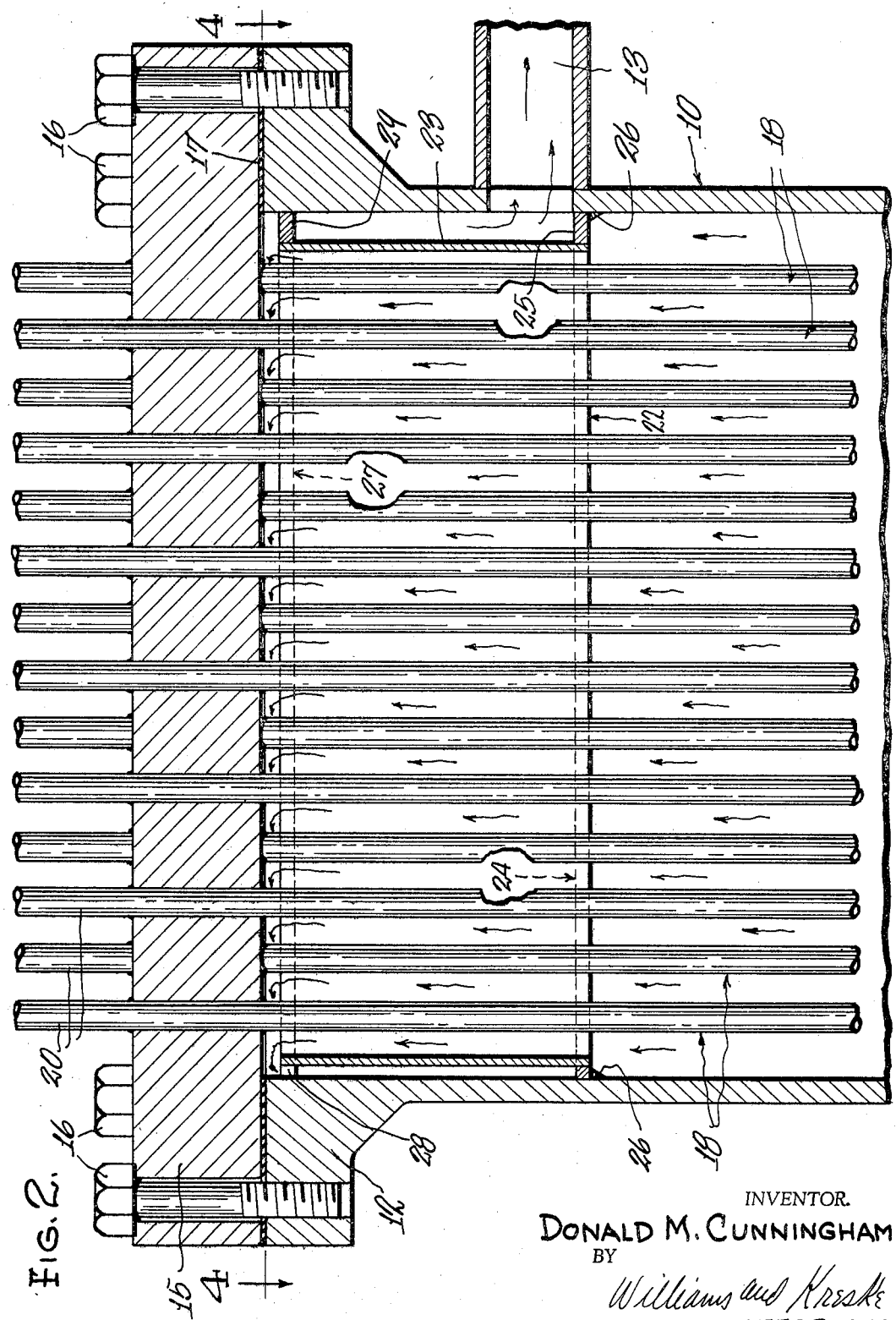

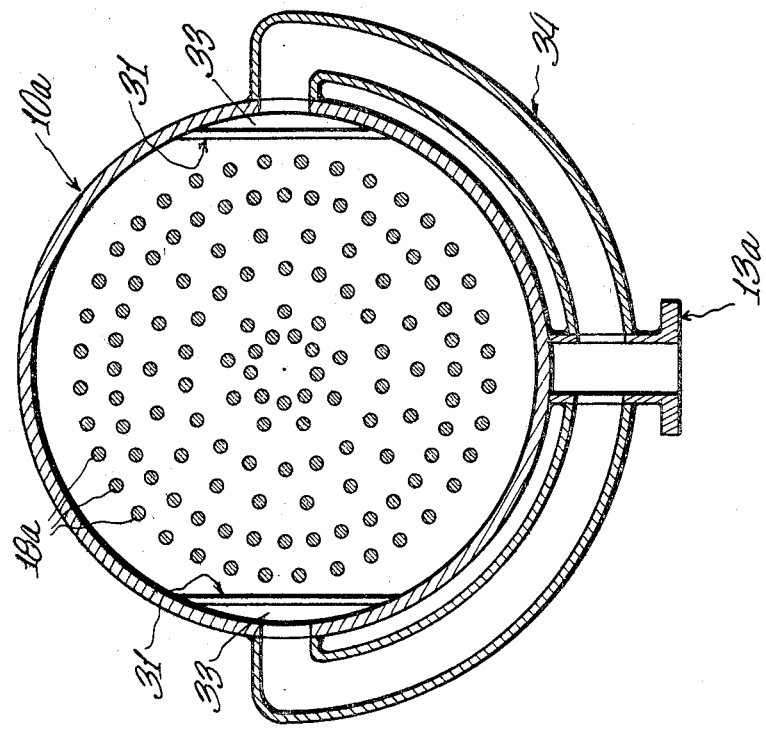
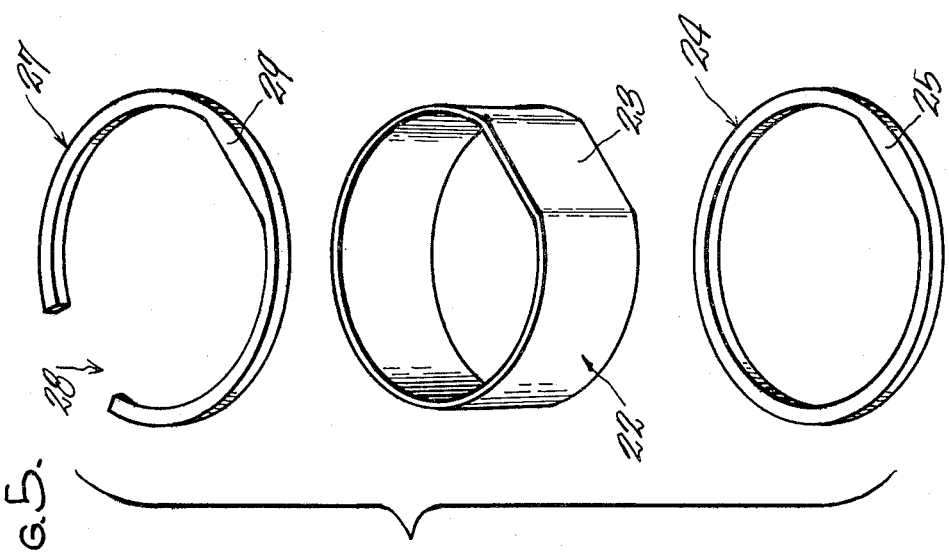

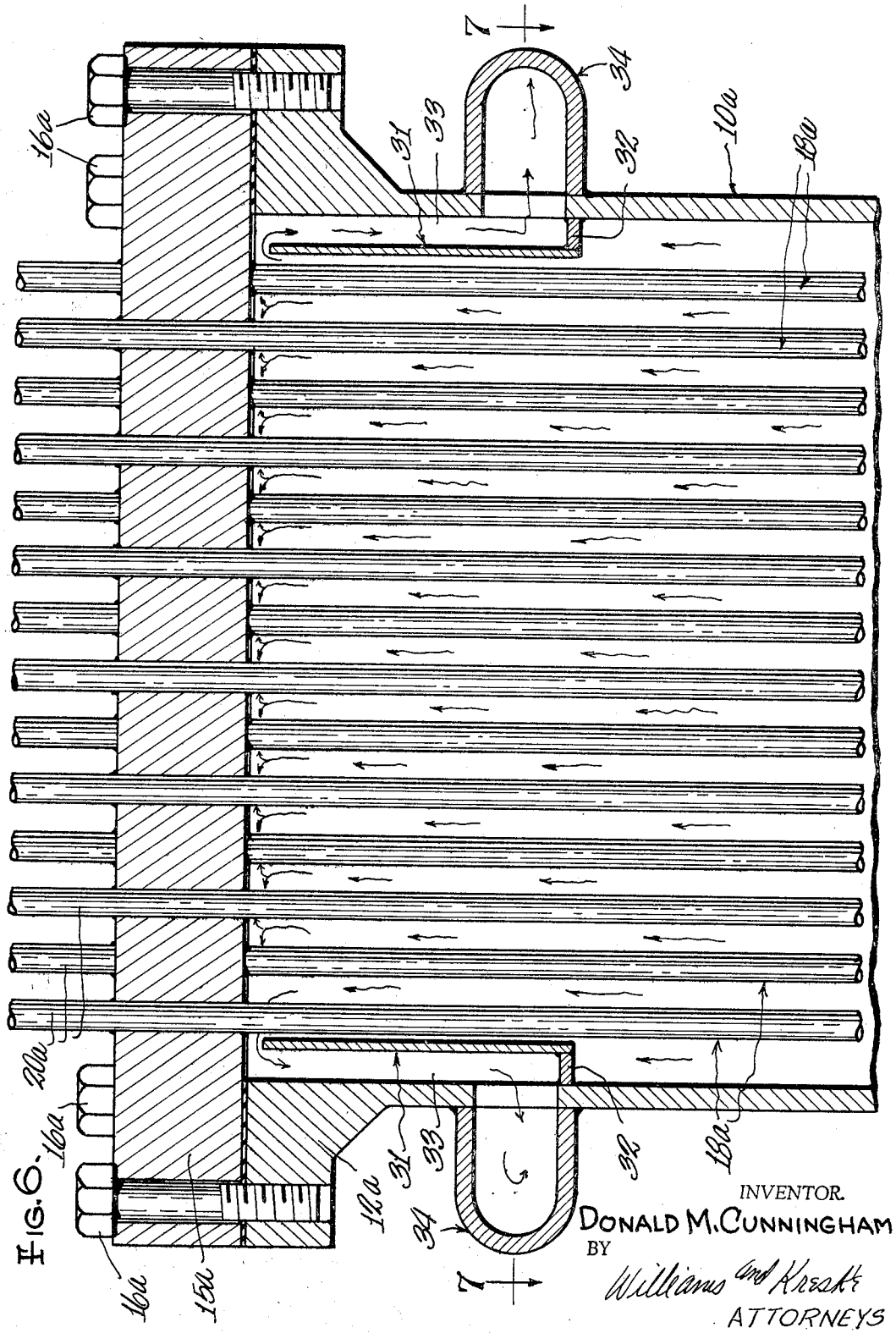

United States Patent Office 3,483,357
Patented Dec. 9, 1969

3,483,357
HEATING APPARATUS
Donald M. Cunningham, Pittsburgh, Pa., assignor, by mesne assignments, to Emerson Electric Co., St. Louis, Mo., a corporation of Missouri
Filed Sept. 16, 1966, Ser. No. 580,080
Int. Cl. H05b 3/78, 1/00
U.S. Cl. 219—316          3 Claims

ABSTRACT OF THE DISCLOSURE

A tank for heating a liquid by means of electric immersion elements carried by a tank cover, a chamber or chambers being provided at the upper inner end of the tank for receiving localized portions of the heated liquid at the very top of the tank, preferably at a point spaced from the outlet of the tank, to insure that heated liquid is removed from the very top of the tank and to guard against stagnant liquid pockets at the tank top.

---

The present invention relates to heating apparatus, more particularly to apparatus for electrically heating a liquid such as water, and the principal object of the invention is to provide new and improved apparatus of the character described.

It has long been recognized that when liquid is heated in a closed container or tank, the heated liquid should be drawn from the uppermost portion of the tank since natural convective flow of the liquid within the tank will cause the hottest liquid to collect at such uppermost tank portion.

Discharge of heated liquid from the uppermost portion of a heating tank is normally effectuated with ease in many heaters such as, for example, in domestic water heaters. However, in many industrial-type liquid heaters, the design is such that it has heretofore been impossible to withdraw the contained liquid from the uppermost tank portion and this results not only in a loss of efficiency but also results in a tendency to localized over-heating of portions of the assembly.

In contrast, the present invention provides liquid heating apparatus in which, although the design in such that the outlet is positioned below the uppermost portion thereof, nevertheless draws the contained liquid from such uppermost portion. The manner in which the foregoing is accomplished will readily become apparent from a study of the following description and from the appended drawings:

In the drawings accompanying this specification and forming a part of this application there is shown, for purpose of illustration, embodiments which the invention may assume, and in these drawings:

FIGURE 1 is a side elevational view of a preferred embodiment of the present invention, FIGURE 2 is an enlarged sectional view through the upper part of the apparatus seen in FIGURE 1, FIGURE 3 is a reduced size perspective view of a detail during an early stage of manufacture thereof, FIGURE 4 is a reduced size, transverse sectional view generally corresponding to the line 4—4 of FIGURE 2, FIGURE 5 is a reduced size, exploded perspective view of a detail seen in FIGURES 2 and 4, FIGURE 6 is a view similar to FIGURE 2 but of another embodiment, and FIGURE 7 is a reduced size, transverse sectional view generally corresponding to the line 7—7 of FIGURE 6.

With reference to FIGURE 1, there is shown a water heater in the form of a vertically elongated, hollow cylinder, or tank 10, having an integral bottom wall 11. The tank is provided with a radially outwardly extending flange 12 at its upper end for a purpose later to appear, and spaced somewhat below such flange, is an integral outlet fitting 13 through which liquid may exit from the tank. As herein shown, an integral inlet fitting 14 through which liquid may enter the tank is provided in the tank bottom. As best seen in FIGURE 2, the open, upper end of tank 10 is closed by a cover plate 15 which is secured to the tank flange 12 by series of capscrews 16. A gasket 17 will preferably be interposed between the cover plate 15 and the tank flange to provide a leak-proof juncture therebetween.

Carried by the cover plate 15 for projection into the tank are a large number of metallic sheathed, tubular electric resistance heating elements 18 of a type too well-known to require specific description thereof. Briefly, however, such elements take the form of an elongated, tubular metallic sheath whose intermediate portion encloses a resistor conductor which generates heat when electrical energy is passed therethrough. Each element is doubled back on itself to a "hairpin" configuration (see FIGURE 3 wherein the plate 15 with but a single element 18 is shown) with the bight end 19 of each element disposed on the lower side of the plate for projection into the tank and with the opposite or terminal end 20 of each element passing through the plate for projection thereabove. Any suitable means, such as welding or the like, may be employed to secure each element to the plate 15 in liquid-tight relation, the element terminal ends 20 above the plate being adapted to be connected (not shown) to a source of electrical energy.

It is to be understood that for maximum heat generation, so many elements are carried by the plate that little or no space remains in which a liquid outlet could be located. Moreover, location of such an outlet in the cover would be unsatisfactory in that a conduit connection thereto would have to be disconnected wherever the plate 15 is removed for heating element replacement or for cleaning of the tank. For these reasons, it is highly desirable to locate the outlet as shown, in the wall of the tank somewhat below the tank flange 12.

With reference to FIGURES 2, 4, and 5, baffle means 21 is provided for restricting flow of liquid outwardly of the tank through the outlet 13 to an area closely adjacent the cover plate 15. This insures that the hottest portion of the contained liquid is drawn from the tank and insures that no stagnant pocket of liquid collects at the hottest portion of the tank; that is, at the underside of the cover plate and the area immediately thereadjacent, so as to overheat the tank and/or the heating element portions adjacent the cover plate.

In the embodiment thus far disclosed, baffle means 21 comprises an annular metal band 22 of a size slightly smaller in diameter than the interior surface of the tank to provide a radial space therebetween. For a purpose to appear, a portion of band 22 is flattened at 23 to provide increased radial clearance with the interior wall surface of the tank. Secured by welding or the like to the lower margin of band 22 is a lower ring member 24 of an external size to snugly fit with the interior wall surface of the tank. Lower ring member 24 has a radially inwardly enlarged portion 25 closely fitting with the flattened band portion 23. From the foregoing, it will be evident that the ring member 24 bridges the annular space between the lower band margin and the interior wall surface of the tank to substantially prevent liquid passage therebetween. Any suitable means may be employed to locate the band 22 with its upper margin spaced slightly below the cover plate 15; for example, locating abutments 26 may be formed within the tank to engage the lower ring member 24 for this purpose.

Secured by welding or the like to the upper margin of the band 22 is a ring member 27 which, with one exception, is otherwise identical to ring 24. It will be noted that ring 27 is not a complete circle; a portion diametrically opposed to the flattened part 23 of the band 22 being removed to provide a gap 28 for a purpose to appear. As best seen in FIGURE 2, the assembled band 22 and its rings 24, 27 are adapted to be disposed within the tank 10 and so orientated that the band flattened portion 23 will be in registry with the outlet 13 and with the gap 28 in the ring 27 providing, as will appear, the sole path through which liquid within the tank may pass to the outlet 13.

Assuming that the tank inlet 14 is connected to a source of liquid to be heated and that the outlet 13 is connected to whatever is to use the heated liquid, it will be understood the energization of the heating elements 18 will rapidly heat the contained liquid. Because heated liquid normally rises, the hotter liquid will tend to collect immediately beneath the cover plate 15.

If the contained liquid is now permitted to escape from the tank interior through the outlet 13, being displaced by liquid which enters the tank through the inlet 14, it will be noted that as shown by the flow arrows in FIGURE 2, liquid immediately underlying the cover plate 15 will be drawn into the radial space between the band 22 and the inner wall surface of the tank via the previously mentioned gap 28 in the upper ring member 27. Such liquid will then flow along both sides of the band 22, in the radial space between the band and the interior of the tank, and out through the outlet 13.

The embodiment of FIGURES 6 and 7 is similar to that previously disclosed and therefore corresponding parts are identified by the same reference characters, but with the suffix "a" added. In this embodiment, the baffle means is in part disposed externally of the tank instead of being wholly disposed therein and to this end, the ring member previously described is omitted and the following structure substitute therefor.

At diametrically opposed portions within the tank 10a plates 31 are welded therein adjacent the top of the tank. Arcuate pieces 32 preferably close off the bottoms of the pockets 33 thus formed by the plates 31 and the inner wall surface of the tank. Note that the tops of respective plates 31 are spaced slightly below the closure plate 15a to provide a gap therebetween for a purpose to appear. Extending about the exterior of tank 10a, well below the tank radial flange 12a, is a conduit 34 whose opposite ends communicate with respective pockets 33 aforesaid. Preferably disposed intermediate the ends of conduit 34 is the outlet 13a which is in communication with the interior of the tank solely through respective portions of the conduit 34. In the embodiment of FIGURES 6 and 7, liquid drawn from the interior of the tank 10a passes into respective pockets 33 from the area at the top of the tank underlying the closure plate 15a and to the outlet 13a via respective portions of the conduit 34.

From the foregoing, it will be apparent that in both of the embodiments hereinabove disclosed, while the tank outlet is placed well below the top of the tank, liquid is drawn from the interior of the tank from an area closely adjacent the uppermost portion thereof.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. A liquid heater, comprising a tank for containing the liquid to be heated, sheathed electric heating means extending into said tank from the top portion thereof, an inlet fitting through which liquid is delivered to said tank, an outlet fitting through which the heated liquid is withdrawn from said tank, baffle means comprising a vertical wall near the top of said tank, at least a portion of which is spaced a slight distance from the inner surface of the tank wall, and a bottom wall closing the space between said inner surface and said vertical wall, the vertical wall, bottom wall and said inner surface combining to form a top-open pocket at a localized place at the top of the tank and into which heated water must flow as it is withdrawn from said tank, and conduit means establishing communication between said pocket and said outlet fitting.

2. The construction of claim 1 wherein said conduit means is disposed within said tank and extends peripherally along the upper portion of said tank.

3. The construction of claim 1 wherein said conduit is disposed exteriorly of said tank and extends peripherally along the upper portion of said tank.

References Cited

UNITED STATES PATENTS

| 2,623,153 | 12/1952 | McGinnis | 219—314 X |
| 3,337,714 | 8/1967 | Buechner | 219—306 X |

FOREIGN PATENTS 758,030 9/1956 Great Britain.

JOSEPH V. TRUHE, Primary Examiner

C. L. ALBRITTON, Assistant Examiner

U.S. Cl. X.R.

165—74; 219—312, 320